No. 645,484. Patented Mar. 13, 1900.
R. G. V. MYTTON.
ROTARY ENGINE.
(Application filed Aug. 2, 1899.)

(No Model.) 10 Sheets—Sheet 1.

No. 645,484. Patented Mar. 13, 1900.
R. G. V. MYTTON.
ROTARY ENGINE.
(Application filed Aug. 2, 1899.)

(No Model.) 10 Sheets—Sheet 4.

No. 645,484. Patented Mar. 13, 1900.
R. G. V. MYTTON.
ROTARY ENGINE.
(Application filed Aug. 2, 1899.)
(No Model.) 10 Sheets—Sheet 5.

Witnesses
F. L. Ourand
Grace O. Brereton

Inventor
R. G. V. Mytton,
By Geo. P. Whittlesey
Attorney

No. 645,484. Patented Mar. 13, 1900.
R. G. V. MYTTON.
ROTARY ENGINE.
(Application filed Aug. 2, 1899.)
(No Model.) 10 Sheets—Sheet 6.

Witnesses
F. L. Ourand
Grace P. Brereton

Inventor
R. G. V. Mytton,
By Geo. P. Whittaker
Attorney

THE NORRIS PETERS CO., PHOTO-LITHO., WASHINGTON, D. C.

No. 645,484. Patented Mar. 13, 1900.
R. G. V. MYTTON.
ROTARY ENGINE.
(Application filed Aug. 2, 1899.)
(No Model.) 10 Sheets—Sheet 7.

Witnesses
F. L. Durand
Grace P. Brereton

Inventor
R. G. V. Mytton,
By Geo. R. Whiteley
Attorney

THE NORRIS PETERS CO., PHOTO-LITHO., WASHINGTON, D. C.

UNITED STATES PATENT OFFICE.

RICHARD G. V. MYTTON, OF MERIDIAN, MISSISSIPPI.

ROTARY ENGINE.

SPECIFICATION forming part of Letters Patent No. 645,484, dated March 13, 1900.

Application filed August 2, 1899. Serial No. 725,890. (No model.)

*To all whom it may concern:*

Be it known that I, RICHARD G. V. MYTTON, a citizen of the United States, residing at Meridian, in the county of Lauderdale and State of Mississippi, have invented certain new and useful Improvements in Rotary Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to rotary engines; and it consists in certain improved constructions and arrangements of parts, as hereinafter set forth, and particularly pointed out in the claims.

The objects of the invention are, first, to provide a compact serviceable engine capable of being operated with economy by steam, compressed air, water, or any other fluid or liquid pressure; second, to provide an engine which can be run either as a motor, as a rotary force-pump, or as both engine and pump, at one and the same time, being operated by any fluid or liquid pressure or pumping or producing compression in any fluid or liquid not hurtful to the material of which it is constructed or being operated by and pumping or producing compression in any such element or substance at one and the same time; third, chiefly to provide a rotary engine, from whatsoever source operated, which shall be simple in construction, economical in operation, and which shall as far as possible adjust itself automatically to wear and run continuously for a long period without repairs or impairment of its efficiency; fourth, to provide a rotary engine wherein the principal moving parts shall have a rotary and not a reciprocating motion, as in the case of so many so-called "rotary" engines; fifth, to provide a construction in which, while all the uses of stops alternatively placed behind and removed from such position in relation to the piston are retained, the chambers so formed for inclosing the steam are produced not by a violent reciprocating movement of some of the parts, but simply by the relative movement of one part to another while both are in continuous rotation; sixth, to provide a rotary engine of such form that it can be adapted to all uses where power is required, especially in a compact form, that can be arranged as a reversible engine with a variable cut-off or a fixed cut-off or for continuous admission of the operating pressure, that will operate expansively or non-expansively, as desired, and that can be arranged as an automatic engine with cut-off valve, increasing or diminishing the supply of the operating pressure to regulate the speed for all conditions of load; seventh, to provide a rotary engine which shall be capable of starting itself from any position; eighth, to gain the maximum area of piston for a given bore of cylinder and to apply power upon both sides of the engine-shaft at one and the same time; ninth, to provide a rotary engine in which the steam-ports shall be open to the full extent during admission and in which the exhaust-ports are open to the full extent as long as the engine is running; tenth, to economize the supply of the pressure-producing agent not by throttling the same, but by keeping the supply-ports open to the full extent during admission and cutting off the supply entirely during expansion.

My rotary engine comprises, in brief, a stationary body or casing, preferably formed like the middle zone of a sphere, a rotatable disk extending diagonally across said casing and dividing it into two similar chambers, the heads of the casing or of the piston having inner conical faces tangent to said disk, a shaft passing axially through said heads and casing, and a double piston or wing extending diametrically across said casing in the plane of the shaft to which it is secured as regards rotary motion and fitting steam-tight against the walls of the casing, the inner faces of the heads, and a diametrical slot in the disk, through which said piston passes. Suitable valve-gear is provided to admit pressure simultaneously behind each half of the piston and exhaust it from in front of the same.

In the drawings.

5 is a section through cylinder on line A B, Fig. 2. Fig. 29½ is a section through cam on line L M, Fig. 23.

In the several views like letters and figures of reference indicate like parts.

Figure 1:
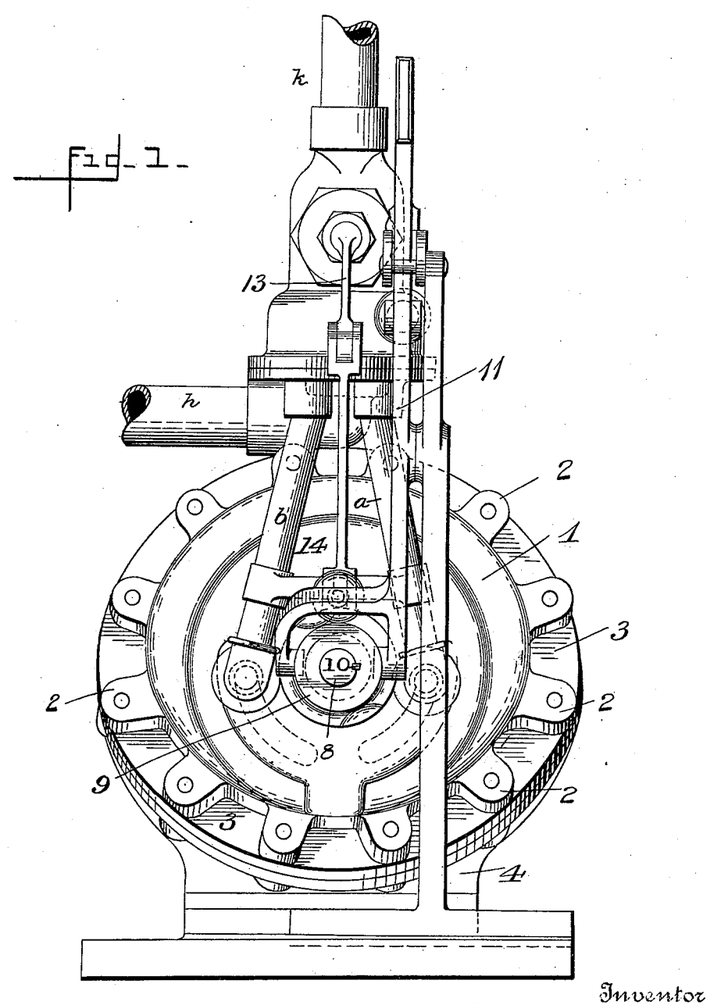
Figure 1 is a front elevation of a reversible rotary engine embodying my invention.

The engine consists, essentially, of a steam-chamber 1, which will hereinafter be designated as the "cylinder," formed in halves, preferably bolted together through lugs 2 on flanges 3 and mounted upon a suitable base, such as 4, Figs. 1 and 3. The cylinder is shaped internally like the central zone of a sphere and has inwardly-projecting heads which are in shape truncated cones and may be either rigid, as shown at 5, Fig. 3, forming part of said cylinder, or movable piston-heads, as shown in the modified form of engine, Fig. 30.

The joint between the two halves of the cylinder is made at an inclination to the vertical plane at an angle corresponding to that of the cone-shaped heads above mentioned, and surrounding the cylinder at the joint is an internal groove evenly divided between the two halves of the cylinder, bounded on opposite sides by a line on each of the conical heads. Into this groove and free to rotate in same is accurately fitted a disk 6. (Shown in proper position in Figs. 3 and 30 and in detail in Figs. 8 and 33.) This disk divides the cylinder internally into two parts, which admit steam or other fluid or liquid in unison.

The disk is pierced diametrically by a slot which is in length the full internal diameter of the cylinder, allowing the piston 7 to pass freely through it, at the same time remaining tight by means of a packed universal joint, to be hereinafter more fully described. The piston shown in Fig. 6 may be integral with or rigidly attached to the engine-shaft 8. The shaft is journaled in suitable bearings in the cylinder-head, with an adjustment for wear of any approved form.

Figure 6:
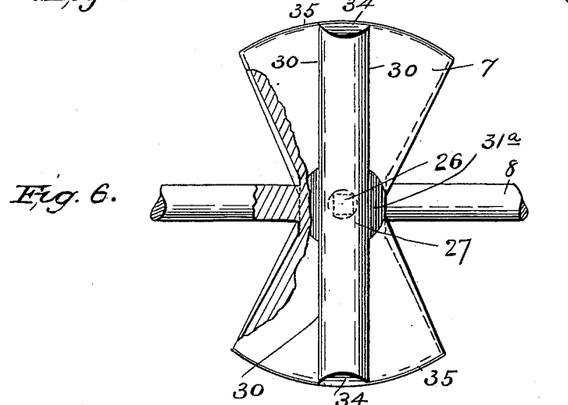
Fig. 6 is a side elevation of piston in vertical position.
Figure 7:
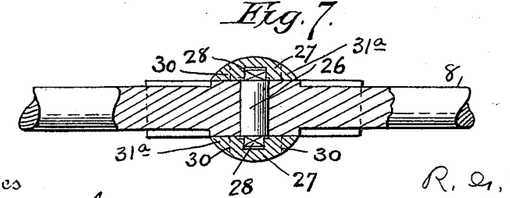
Fig. 7 is a sectional plan of piston, section taken through horizontal center line, Fig. 6.

The piston is accurately shown in Figs. 6 and 7. It is of a form to fit diametrically into the interior of the cylinder and is preferably formed integral with the shaft, as shown in detail. (For convenience the modification of piston will be described hereinafter.) In Fig. 7 the piston is shown of greater thickness than the shaft and has parallel plane faces, upon each of which joint-strips 27 are centrally pivoted upon the pin 26, which is free to turn in the piston, and has square ends 28, fitted into like recesses in the center of the said strips 27, clearance being provided in same, as shown in Fig. 7, to enable them to move inward against the faces of the piston as the surface wears away. In motion the strips 27 oscillate upon opposite faces of the piston, guided by the square heads of the pivot 26 and by the interior faces 29 of the slot in the disk 6, Fig. 8. Referring to the sectional plan, Fig. 7, of the piston with the strips in position, it will be seen that their inner faces are flat and form a joint with the piston, while their outer faces are formed as a portion of a cylinder whose axis is the center of the piston in plan. (See line marked R, Fig. 7, and corresponding lines marked R in Fig. 9, showing disk in plan.) Their edges 30 for their entire length, except at the center, are flat and parallel, as shown, and form a continuous surface with the face of the disk when the piston is in a vertical position and are inclined to same at the greatest angle when the piston is horizontal, as shown in end view in Fig. 3. The central portions of said strips 31ª are formed in the following manner for the purpose of closing the nearly-triangular openings, which would otherwise appear and allow steam to escape from one side of the piston to the other and interference with the efficient working of the engine. Their edges are bounded by arcs of a circle whose center is at the intersection of the horizontal and vertical center lines on Fig. 6 with a radius equal to the distance from this point to the truncated face of the cylinder-head, allowing the strips to thus oscillate between the cylinder-heads and touching the latter at their innermost portions on either side. Their outer faces are a continuation, meeting the faces of the piston, of the cylindrical surfaces of their remaining portions.

The piston, Fig. 6, may be provided with packing-strips upon its edges, pressed outward by springs or other suitable means, though such will not ordinarily be necessary, owing to the peculiar form of the surfaces in contact. It is a matter of design as to whether the piston shall have a thickness equal to, greater than, or less than the diameter of the shaft. In the last-named case some form of ball-joint at the center of shaft, piston, and disk becomes necessary, and the joint-strips are modified at their centers, as shown in Fig. 34, to form part of such ball-joint.

Figure 8:
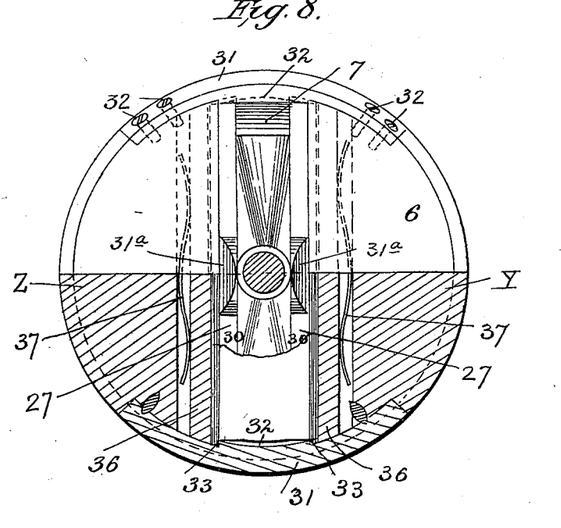
Fig. 8 is a half-face view of disk, with edge view of piston in position, and half-section through center of disk, with edge view of piston in position.
Figure 9:
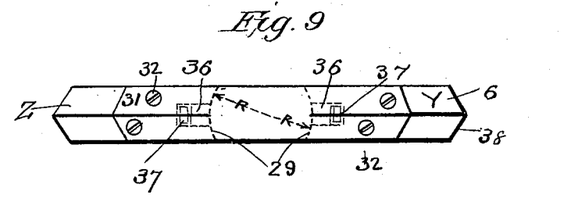
Fig. 9 is a plan of disk.

The disk, Fig. 8, has been to some extent hereinbefore described. It is preferably formed in two main portions Y and Z, having caps 31, with screws 32 tying the whole together. This construction may, however, be varied in many ways. For instance, the caps may be in the form of a continuous annular piece shrunk onto the interior portions, having interior projections fitting into like depressions in said interior portions to tie the whole together. For present description, however, the construction set forth in Fig. 8 will serve all purposes. The disk is pierced diametrically by a slot extending for the full diameter of the bore of the cylinder, its inner edges at the boundary of said slot being curved, as shown at 29, Fig. 9, enabling the disk, with one of the caps 31 removed, to receive the piston 7, with joint-strips 27 adjusted in position. The caps 31 are formed with slight shoulders 33, accurately fitting between the faces 29 of the disk and tending to hold the two parts Y Z of the same in proper relative position, their inner projecting faces partaking of the same of the bore of the cylinder, closing the ends of the slot in the disk, and making a steam-joint with the ends 34 of the joint-strips 27 and with the edges 35 of the piston 7. It will be noted from the foregoing description that the joint-strips are held as a whole in the general plane of the disk with which they rotate, together with the piston, at the same time oscillating between the inner edges 29 of the disk to provide for the changing angle which the piston in rotation makes with the diameter of the disk whose position it occupies.

Figure 3:
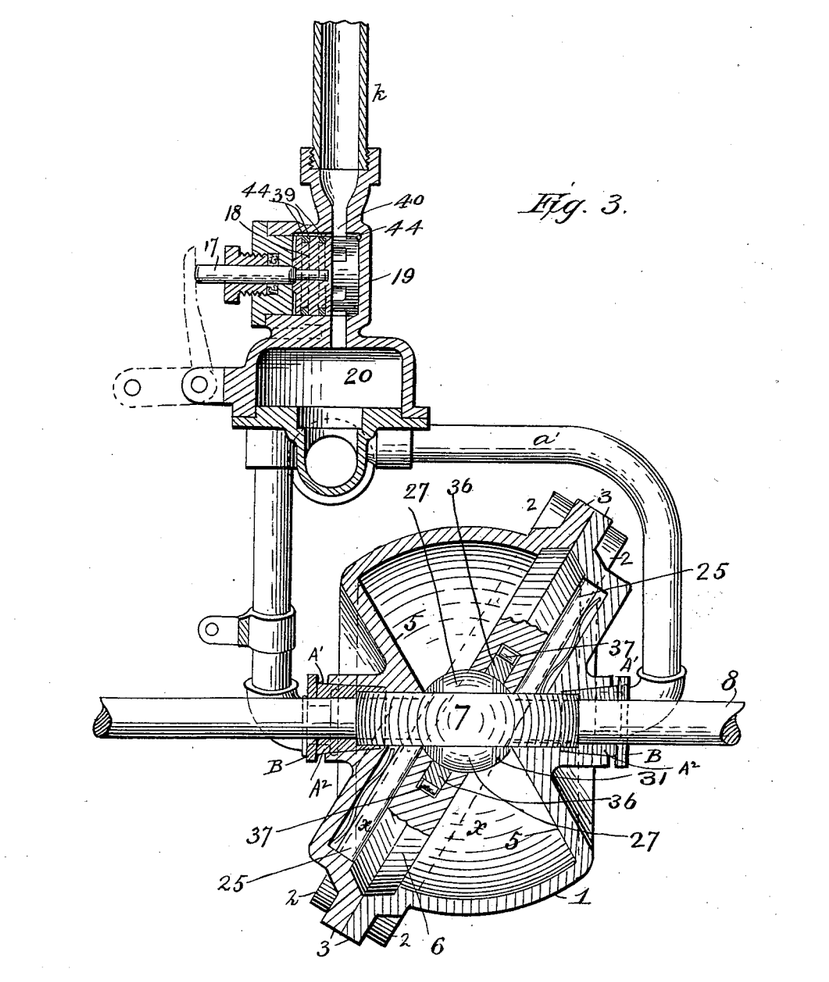
Fig. 3 is a sectional side elevation of the same.

I do not depend upon the fit of the joint-strips between the inner curved edges bounding the slot in the disk to form steam-joints, but provide packing-strips 36, Figs. 3, 8, and 9, fitting accurately into recesses at the center of the thickness of the disk and having inwardly-curved faces adapted to accurately fit upon the curved surfaces of the joint-strips 27 and pressed toward same by means of springs 37 or other suitable means. It is necessary to form the edges of the disk V-shaped, as shown in plan, Fig. 9, and in the sectional views, to permit the removal of the disk from the cylinder in the direction of the shaft. To withdraw the shaft with piston and disk, the piston is moved to a horizontal position, as in other positions it serves to lock the two halves of the cylinder together, preventing the removal of one of them.

Figure 2:
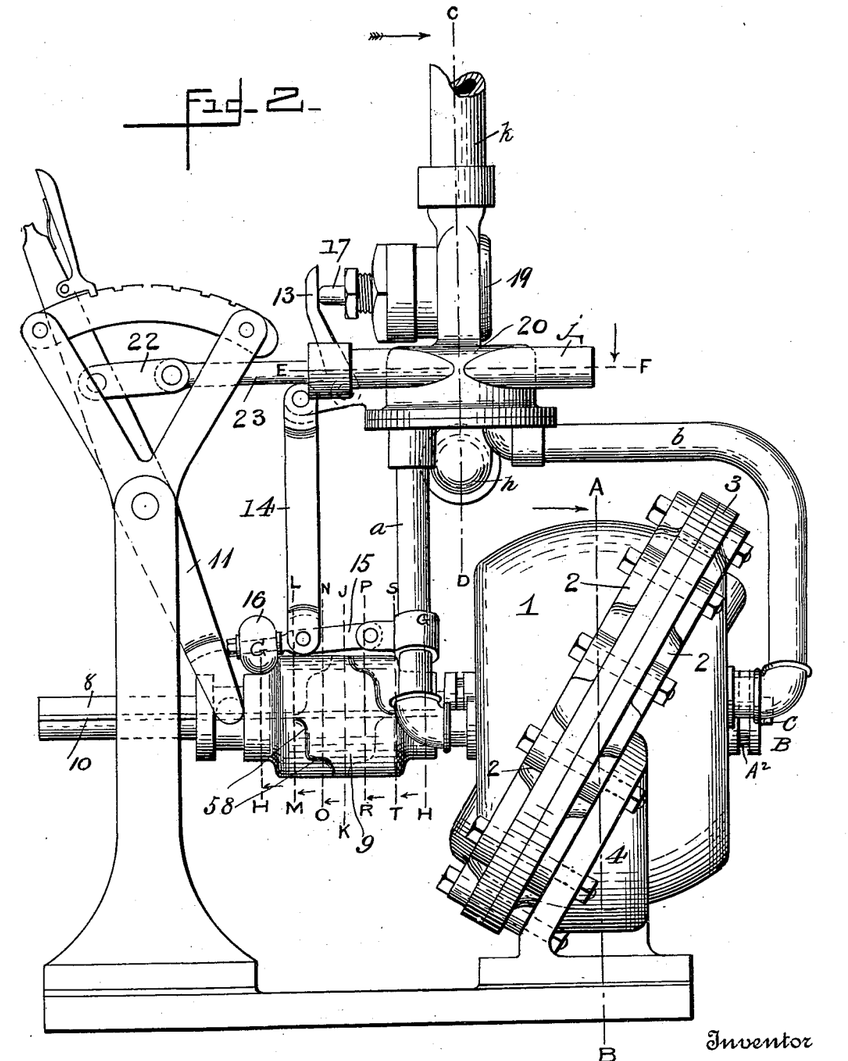
Fig. 2 is a side elevation of the same.
Figures 23, 24, 25, 26, 27, 28, 29:
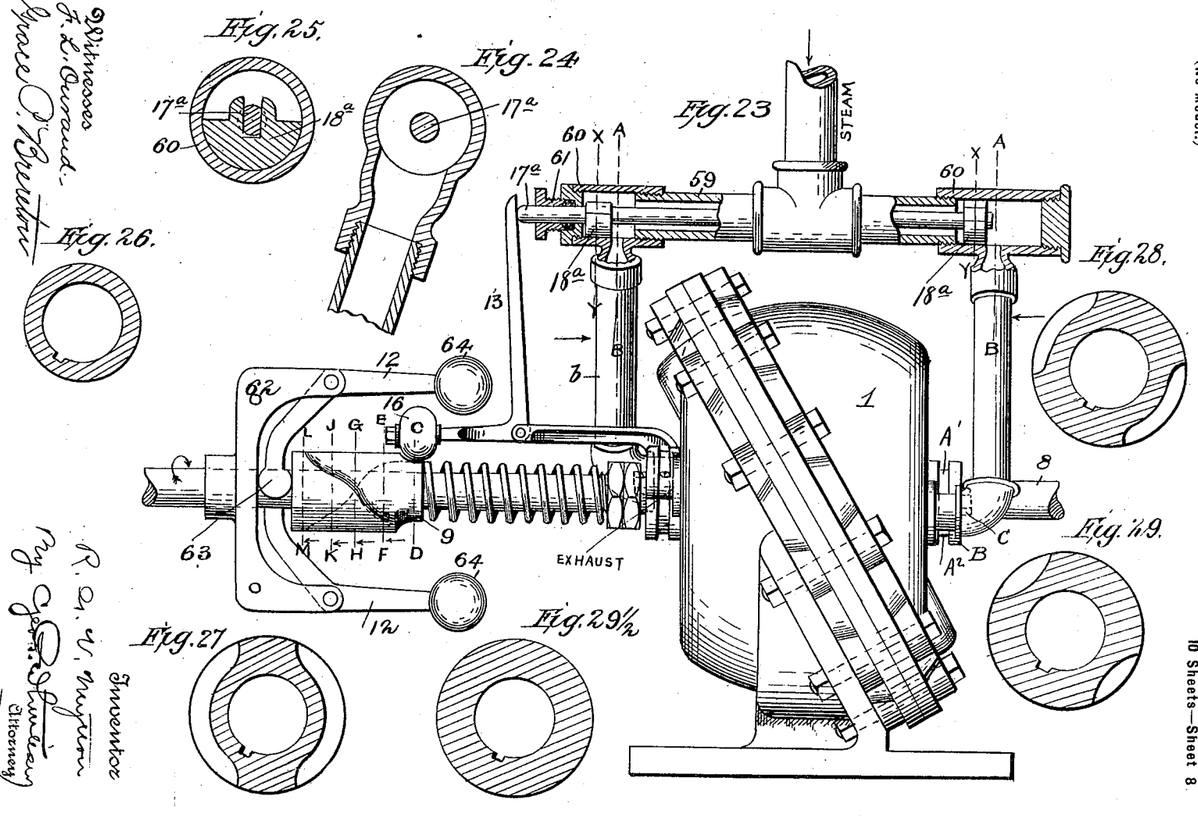
Fig. 23 is a side elevation of an automatic rotary engine embodying my invention.
Fig. 24 is a section through steam-ports on line A B, Fig. 23.
Fig. 25 is a section through cut-off valves on line X Y, Fig. 23.
Fig. 26 is a section through cam on line C D, Fig. 23.
Fig. 27 is a section through cam on line E F, Fig. 23.
Fig. 28 is a section through cam on line G H, Fig. 23.
Fig. 29 is a section through cam on line J K, Fig. 23.
Figures 30, 34, 35:
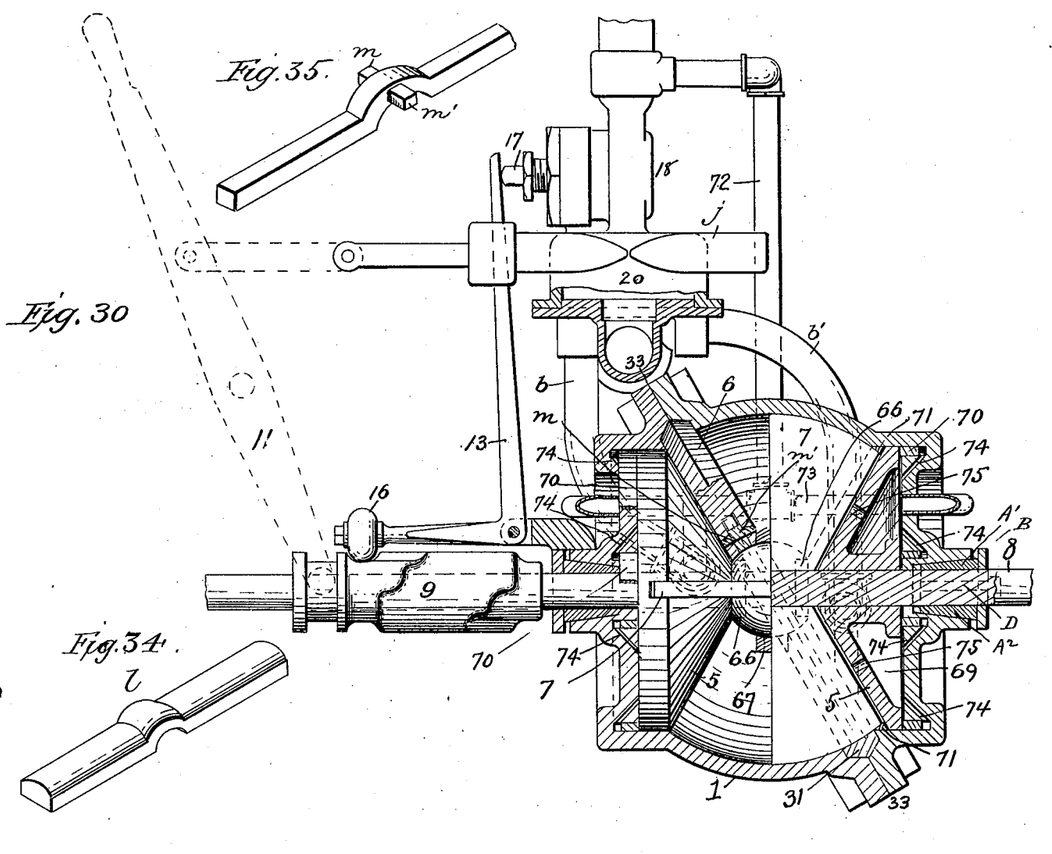
Fig. 30 is a sectional side elevation of a modified rotary engine arranged to reverse.
Fig. 34 is a modified form of joint-strip.
Fig. 35 is a modified form of packing-strip adapted for use in connection with above.

Mounted upon engine-shaft 8 and capable of sliding on a feather 10 is a cam 9, the position of which longitudinally on the shaft is regulated, in the case of a reversible engine, by the reversing-lever 11, Figs. 2 and 30, or by the governor 12, Fig. 23, in the case of a non-reversible engine. The cam gives motion to a lever carrying a roller 16, with a rounded periphery, which is at all times in contact with the cam. This may be a bell-crank lever 13, as shown in Figs. 23 and 30, or be an arm 15, connected, by means of link 14, as shown in Fig. 2, to the bell-crank lever 13. The other arm of the bell-crank bears against the stem 17 of and operates to close a cut-off valve 18, Figs. 2, 3, 23, and 30, which is normally held open, as shown in the several views.

Figure 10:
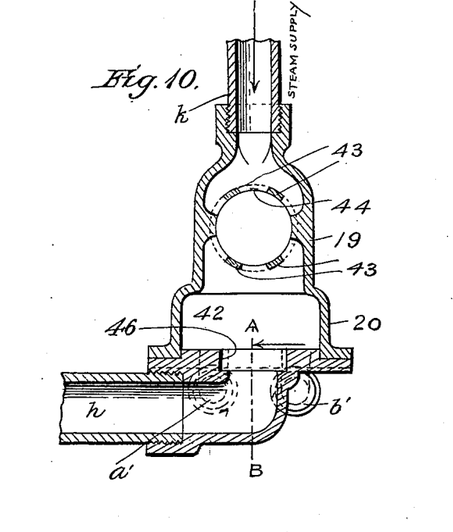
Fig. 10 is a section through C D, Fig. 2.

The cut-off valve 18 is shown in Fig. 3 as a plain short piston-valve having annular packing-rings 39, which straddle the port 40 when the valve is closed, cutting off communication between the cut-off-valve chamber 41, Fig. 10, and the reversing-valve chamber 42.

Figure 4:
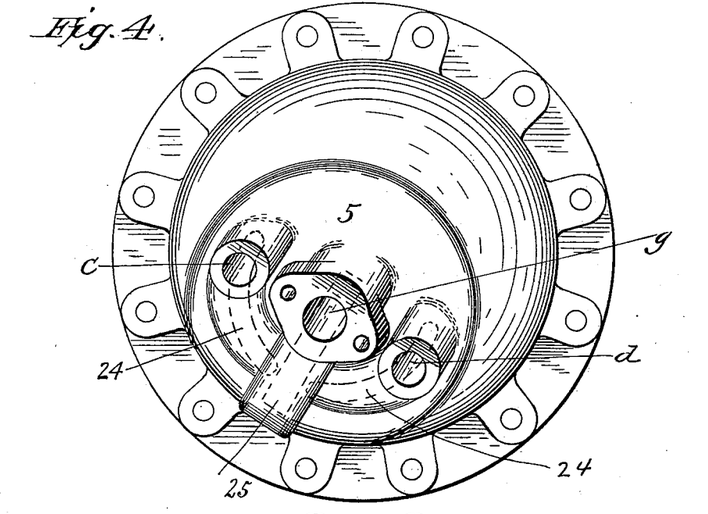
Fig. 4 is a projected view showing exterior form of cylinder or body. Fig.
Figure 5:
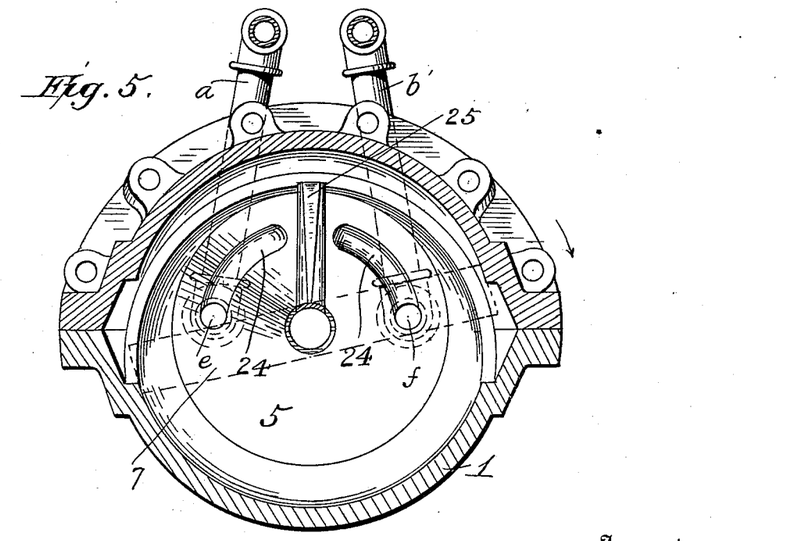

Ribs 43 are provided in the usual manner to hold the packing-rings 39 in position. The valve is balanced by means of small ports 44, Figs. 3 and 10, leaving an area equal to that of the cross-section of valve-stem 17 for the steam to act upon to hold the valve normally open and by pressure upon the arm of the bell-crank 13 to hold the roller 16 at all times in contact with the surface of cam 9. The reversing-lever is placed at starting at the limit of its motion to one side or the other, according to the direction of rotation required. In this position the cut-off valve is inoperative, the piston-wings themselves doing the duty of valves, and the engine then operates as follows:

Referring to Fig. 10, steam enters the supply-pipe $k$, passes the open cut-off valve, and with the reverse-lever in the position shown in Fig. 2 enters the pipes $a$ and $a'$, which enter the cylinder-heads through ports $d$, Fig. 4, and $e$, Fig. 5, respectively. Now assuming that the position of the piston is that shown in Fig. 5, the steam bears upon the top of the left wing 4 upon the bottom of the right, carrying it around through half a revolution, when the opposite wings come into play, and immediately afterward the ports $f$ and $c$ are uncovered by the revolving piston, and the steam admitted during the first half-revolution commences to exhaust through these ports and is conducted by the pipes $b$ and $b'$ into the exhaust-cavities of the reversing-valve and into the condenser or atmosphere through the exhaust-pipe $h$. In the case just described the direction of rotation is indicated by the arrow to the left of Fig. 5. Now suppose the steam and exhaust ports to be reversed by the reversing-valve. The pipes $b$ and $b'$ will now be supplying steam through the ports $c$ and $f$, respectively, and exhaust will take place through the ports $d$ and $e$ through the pipes $a$ and $a'$, respectively, through the cavities in reversing-valve and out through exhaust-pipe $h$, as before.

Referring again to Fig. 5, the lower edge of the piston-wing to the right of the figure and the upper edge of the wing to the left of same have just covered the ports $f$ and $c$, respectively, thus leaving the upper side of the piston to the right and the lower side to the left to be acted upon. The steam inclosed during the previous half-revolution is still operative until the piston reaches a horizontal position, immediately after which, having uncovered the ports $e$ and $d$, it is released and commences to exhaust. It will be noted that the effect of the grooves 24, Figs. 5, &c., is to continuously admit steam to opposite sides of opposite wings of the piston until the other wings have attained sufficient area for effective work and also to give a free exhaust.

Referring to Fig. 3, the maximum area of piston subjected to pressure at one time is equal to the area of the two approximately sector-shaped spaces shown therein, and the maximum area is equal to one of them. When the piston is in a horizontal position, each wing has an area exposed to the pressure equal to half the area of one of said spaces.

When the reverse-lever is moved nearer to the center of the quadrant, the cam comes into operation, and as soon as opposite wings of the piston have covered their steam-ports (as $f$ is covered, in Fig. 5, with the engine taking steam through the pipe $b'$) the cam 9 allows the roller 16 to fall, thus admitting steam to the cylinder, the period of admission depending upon the position of the cam as regulated by the reverse-lever 11. The steam thus admitted and cut off by its expansive force carries the piston through half a revolution, when it is admitted to the opposite wing of the piston and the former inclosed steam being of no more effect is freely exhausted.

The cam is formed with a larger and smaller diameter. When the roller is in contact with the cam at its smaller diameter, the cut-off valve opens, and when it is in contact with the same at its larger diameter it operates to close the valve and cut off the supply. Referring then to Fig. 2 and considering the cam 9 in connection with the several sections, Figs. 19 to 22, inclusive, it will be noted that in either extreme position of the cam steam is admitted continuously, the position of the reversing-valve as operated by the reverse-lever deciding the direction of rotation of the engine-shaft. When the reverse-lever latch is in the central notch of the quadrant, the cut-off valve is held closed continuously, the reversing-valve at the same time covering all ports, and the engine stops. Referring to the sections, the arrows indicate the direction of rotation of the engine-shaft when each of said sections operates the cut-off valve. Similar sections, as in Figs. 19 and 20, for opposite directions of rotation are placed one above the other.

Figure 19:
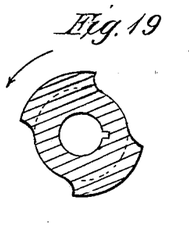
Fig. 19 is a section through reversing-cam on line L M, Fig. 2.
Figure 20:
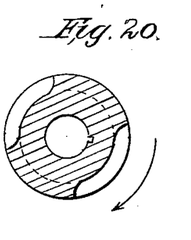
Fig. 20 is a section through reversing-cam on line S T, Fig. 2.
Figure 21:
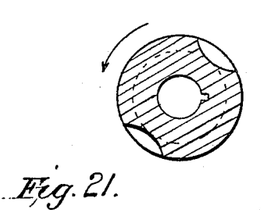
Fig. 21 is a section through reversing-cam on line N O, Fig. 2.
Figure 22:
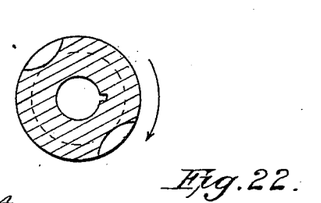
Fig. 22 is a section through reversing-cam on line P R, Fig. 2.

Figs. 19 and 20 show a considerable period of admission and Figs. 21 and 22 a short period. They also show that steam is admitted twice during each revolution as opposite wings of the piston come into play and, further, that steam is admitted upon a straight line for all times of cut-off—i. e., when the piston is in an approximately-horizontal position. By this form of cam having steps, as 58, Fig. 2, one or more fixed points of cut-off can be provided for for each direction of rotation, two such fixed points of cut-off for each direction of rotation being provided for on cams depicted in Figs. 2 and 30. The most desirable form, however, is one in which the boundary-line (at which cut-off commences) of the larger diameter of the cam becomes a portion of a true helix, thus varying the cut-off between any two limits. Such a form is shown on the non-reversible engine arranged to automatically regulate the cut-off. (Shown in Fig. 23.)

The cam previously referred to as having one or more fixed points of cut-off instead of varying evenly between any two limits is so constructed as to obviate the employment of a cam of inconvenient length.

In the reversible engine when the reverse-lever is placed in either extreme position the roller 16 for operating the bell-crank simply rolls upon the periphery of the cam at its smaller diameter and does not at any time close the cut-off valve, with the result that the engine starts itself from any position, there being no dead-point.

When the reverse-lever is placed in any intermediate position between "stop" and "full ahead" or "full astern," the cam comes into operation and holds the cut-off valve closed for the desired portion of the revolution, the steam then acting expansively.

When the cam is placed so as to operate the cut-off valve at, say, one-fourth of the stroke, steam is admitted when the piston has reached a horizontal position and operates upon one face of it at one end of the cylinder and upon the opposite face at its opposite side at the other end of the cylinder. When the piston reaches a vertical position, the steam is cut off and then operates expansively until the piston has described three-quarters of a revolution from the vertical position and is again horizontal, exhaust then commencing through the opposite ports, when the same cycle of operations is repeated.

Referring to Fig. 5, it will be noted that the cylinder-heads are internally grooved out at 24 at the entrance of the ports, the grooves extending around the heads to a distance as near as possible to the packing-strips 25, Figs. 3 and 5, which forms a tight joint at all times with the surface of the disk 6, Figs. 3 and 8. Their faces partake of the general surface of the cone-shaped heads, their outermost faces having a narrow V-shaped flattened surface widening toward the circumference in order to form a perfect joint with the face of the disk, their edges on either side being then rounded off, as shown in Figs. 3 and 5, in order to allow the edges of the piston to glide easily over them without shock or jar, which is essential to the satisfactory running of the engine.

In the reversing engine and placed immediately below the cut-off-valve chamber 19 is a reversing-valve chamber 20, containing the reversing-valve 21, which is moved by the reverse-lever 11 simultaneously with the cam 9 by means of the link 22, connected to the valve-stem 23, formed with a rack upon one side which engages with the teeth upon the back of the valve 21, Fig. 13, which it rotates upon its seat.

Figure 11:
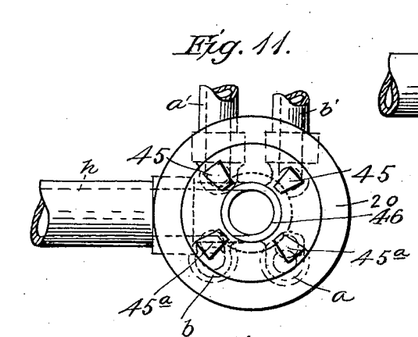
Fig. 11 is a plan of reversing-valve seat.
Figure 12:
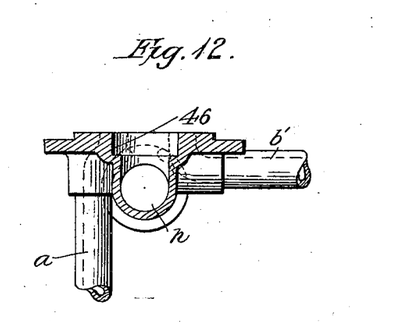
Fig. 12 is a section through A B, Fig. 10.

A plan of the valve-seat is shown in Fig. 11, wherein two of the ports 45 open into channels (pipes being shown on the drawings) $a'$ and $b'$, leading to one section of the cylinder and the remaining two, $45^a$, leading to the other section through pipes $a$ and $b$.

Figure 13:
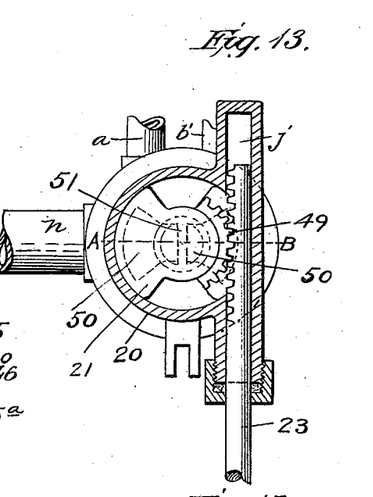
Fig. 13 is a section through E F, Fig. 2.
Figures 14, 15, 16:
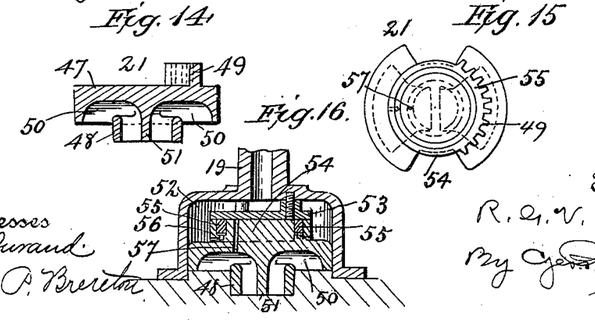
Fig. 14 is a section through valve at A B, Fig. 13.
Fig. 15 is a plan of a balanced reversing-valve.
Fig. 16 is a sectional elevation of same in position.
Figure 17:
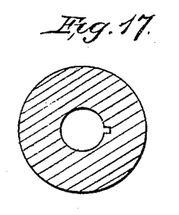
Fig. 17 is a section through reversing-cam on line J K, Fig. 2.
Figure 18:
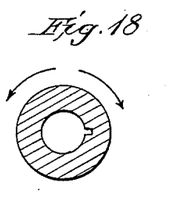
Fig. 18 is a section through reversing-cam on line G H, Fig. 2.

The valve-seat is centrally counterbored at 46 to receive the projecting teat 48 of the valve 47, Fig. 14, upon which as a center it is rotated by means of the rack formed on the valve-stem 23, which moves in a cylindrical guideway $j$, Figs. 2, 13, and 30, by the action of the reverse-lever 11, as previously described. The teeth 49, Figs. 13 and 14, are properly shown therein. In the plan of the valve, Fig. 13, the portion bounded by the outside line of valve and by the dotted lines exterior to the teat 48 shows the shape of the face of the valve which is in contact with the seat. The exhaust-cavities 50 are thoroughly shown in Figs. 13 and 14, as is also the central dividing-rib 51, whose function is to deflect the issuing exhaust-steam from one section of the cylinder, so that it will not create back pressure in the other section.

The reversing-valve operates to simultaneously admit steam to ports at both ends of the cylinder and behind the piston upon opposite sides of the shaft and to exhaust it from the other two spaces in front of the piston. This valve also serves to reverse the steam and exhaust ports. When the cam is properly designed, as in Fig. 30, and when the reverse-lever is moved from the position of "stop"—i. e., when the latch is moved from the central notch of quadrant to the first notch therefrom on either side—the valve is opened to the full extent to cause the engine to run either way, and a further movement of the valve to one side or the other does not change the conditions, with the result that a full opening of steam-port is obtained in all running positions. Hence there is no "throttling" or "wire-drawing" of steam, and the greatest economy is secured through the operation of the cut-off valve. It is a well-known fact in practice that devices for regulating the supply of steam, such as throttling-governors, are poor appliances for economy and that the greatest economy is obtained by giving a full opening of steam-port during admission and cutting off the supply entirely after a portion of the stroke has been completed. This result is obtained by means of the reversing-valve jointly with the cut-off valve operated by the adjustable cam, as above described.

Fig. 15 is a modified form of reversing-valve, essentially the same as the one described, showing how in a large engine same may be readily balanced. Fig. 16 is a sectional elevation of such a valve in position in a suitable valve-chamber 52, fitted with a circular balance-plate 53, attached in the usual manner. Referring again to the plan of valve, Fig. 15, it will be seen that the valve is provided with a circular crown 54, having an annular groove in same into which is fitted a similar balance-strip 55. One or more ports 56, leading to under side of said strip 55, pack same upward against balance-plate 53. One or more ports 57, leading from the inclosed area to the exhaust-cavity, conduct away any steam which may leak through. Fig. 23 shows the engine arranged as an automatic engine. In this view the steam-admission pipes only are shown. The exhaust-ports may be connected by pipes in any convenient manner to a common outlet. The construction is so thoroughly shown in the figure that very little explanation will be necessary. The supply-pipe, as shown, enters a cross-pipe 59 with enlarged ends 60, forming a steam-chest. The cut-off valves $18^a$ are mounted upon a common stem $17^a$, projecting through a stuffing-box 61, the stem being notched out on either side to fit into slots in said cut-off valve, as shown in Fig. 25, allowing the valves free motion downward upon their seats, but holding them longitudinally in position on said stem. A bell-crank lever 13 carries a roller 16, with rounded periphery, bearing against and capable of rolling upon a cam 9, arranged to admit steam continuously at starting and controlled by a governor having bell-cranked arms 12, pivoted upon a suitable carrier 62, which is rigidly attached to the shaft, their ends 63 bearing against and forming a stop for the cam in position shown, a greater divergence of the balls 64 causing the cam to operate to produce a longer cut-off, and so automatically rendering the speed of the engine constant by regulating the supply of steam thereto under all conditions of load.

The sections of this cam, Figs. 26 to 29½, inclusive, are self-explanatory, following the previous description. The curved lines bounding the depressions upon the periphery of the cam are portions of true helices, as hereinbefore described.

Figures 31, 32, 33, 36, 37:
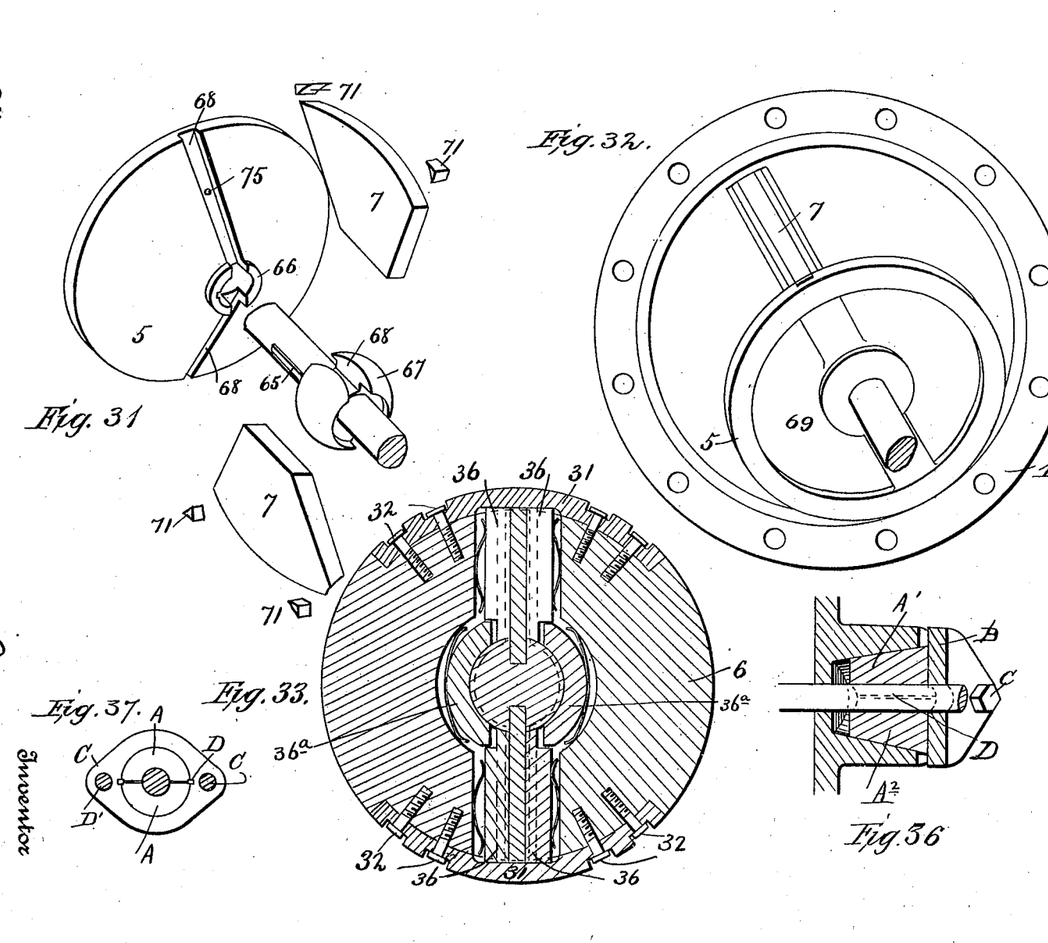
Fig. 31 is a group of parts forming piston of same engine.
Fig. 32 is a projected view of engine with one cover removed from face of joint, showing back view of one of the piston-heads and piston in a vertical position.
Fig. 33 is a section through disk, piston-blades, and ball-joint on line 33 33, Fig. 30, showing modified form of universal joint.
Fig. 36 is a sectional perspective view of an adjustable bearing for keeping the shaft in alinement when it passes through the heads of the casing.
Fig. 37 is a view of the face of the bearing with the gland B removed.

Figs. 30 to 33 show a modification of the body of the engine, wherein 5 5 are movable piston-heads sliding upon feathers on the shaft, one of which, 65, is shown in Fig. 31, said piston-heads having their inner faces conical and provided with annular projections 66 at the apex of the cone, fitting into like recesses in a ball-joint 67 on either side, all three parts being grooved exteriorly, as shown at 68, upon diametrically-opposite sides of the shaft to receive the two piston-blades 7, which fit neatly into said grooves, but are at the same time free to slide radially in the same. The surfaces of the piston-heads outward from the bases of the cone are short cylinders, which are ground to a true fit in like recesses in the cylinder-heads. They are cored out under their outer faces at 69, forming cavities into which steam-pressure is directed to pack the several parts. Bearing upon the outer faces of each of these piston-heads are two annular packing-rings 70. (Shown in section to the right of the vertical center line and partly in section to the left of the same.) To the right also of the same center line the piston-blades 7 are shown in a vertical position and to the left of the same line in a horizontal position. Fitting into the small recesses formed between the ends of the slots 68 in the piston-heads 5 and the edges of the piston-blade 7, which fit into said slots, are four small filling-pieces 71, Figs. 30 and 31, approximately triangular in form, which form steam-joints and at the same time form an adjustment for wear at these points. The steam-ports differ from those in the form of engine previously described in that they enter upon the sides of the cylinder, as shown in Fig. 30, in place of at the ends of same, as in Figs. 1, 2, 3, and 5. They are similarly grooved out upon the interior of the cylinder to a position as near as possible to the line of contact of the piston-head (see dotted lines, Fig. 30) with the disks for the purpose, as in the former cases, of balancing one wing of the piston while the other is being acted upon and of entirely exhausting upon the opposite side to prevent retardation of the piston and also to enable one wing of the piston when steam is being admitted continuously to cut off the steam from the opposite wing when it is itself in an effective position to be acted upon. The cut-off valve, with or without the reversing-valve, is used in connection with this modified construction in the same manner as in the engine previously described, and a separate supply-pipe 72 for pressure is provided, connecting with branch pipes 73 to supply the ends of the cylinder for the purpose above specified. Filling the cavities 69, pressure reaches the annular packing-strips 70 through ports 74, forming two joints behind the piston-heads, and through ports 75 reaches the piston-blades 7 on their inward edges, which it thus packs outwardly against the walls of the cylinder. The direct pressure behind the movable piston-heads also acts to pack them against the faces of the disk to form steam-joints. The piston-heads having a rolling contact with the disk, friction and consequent wear of these parts is reduced to a minimum. This arrangement, it will be seen, provides an admirable automatic adjustment for wear and enables the engine to run for a long time without repair and without leakage, caused by wear, with its consequent reduction of efficiency. The form of joint between the piston-heads and cylinder-heads obviates the necessity for stuffing-boxes for the engine-shaft to pass through, leaving only the necessity for suitable devices to keep the shaft in proper alinement, as shown in Figs. 36, 37, &c., wherein $A'$ and $A^2$ are the two halves of a tapered bearing fitting into similar recesses in each of the cylinder-heads. They are forced inward (to take up wear) by means of glands B, held by studs and nuts C C', and are held from twisting around by means of feathers D D', set in the walls of the tapered recesses.

Fig. 33 is a section through line 33 33, Fig. 30, of the disk in its inclined position on the shaft, together with a section through the ball-joint 67, which is here shown as being integral with the shaft, and through the piston-blades 7. A modification of the joint-strips 27 (shown in Fig. 6) may be provided, having concavo-convex central portions $l$, Fig. 34, fitting into concavities in the center of the disk, and in all other respects similar to those shown in Fig. 6. A modification of the packing-strips 36, Fig. 8, &c., is shown in Fig. 35, adapted for use with above-mentioned joint-strips, fitting accurately upon the outer faces of same and having wings $m$ $m'$ to keep them in contact with the central portions of said joint-strips when they move to the position shown in Fig. 30. A modification of this joint is shown in Fig. 33, wherein the joint-strips 27 are dispensed with, the packing-strips 36 (shown in full at upper portion of Fig. 33 and in section at its lower portion) bearing against the piston-blades having rounded faces and yielding slightly inward in the slots in the disk against the springs 37 to allow for the relative twisting of the disk upon the piston-blades. Additional strips $36^a$ are provided, embracing the ball-joint, as shown. The preferable construction, however, where the ball-joint is used retains the joint-strips 27, though the modified construction may be used with advantage with the piston shown in Fig. 6, first described, the packing-strips with rounded faces in this case extending completely across the plane faces of the piston and forming a very satisfactory construction.

I do not limit myself to any special method of forcing the various packing-strips into contact with the several working faces. Springs or fluid-pressure may be used at will. The same remark applies to the cut-off valve, and, further, the cut-off valve may be normally held closed and be opened by the action of the cam, though the method given previously is preferable.

The reversing-valve chamber is only large enough to contain the reversing-valve and at the same time permit the free passage of steam to the ports in order that the steam cut off by the cut-off valve may have as little space exterior to the cylinder in which to expand and be thereby enabled to expend as much energy as possible in driving the piston.

It is possible to make an engine of the general construction given, but having its body of a true cylindrical form. The disadvantage of such a construction would be, however, the larger diameter of the disk required in proportion to the bore of the cylinder.

I wish it to be particularly noted that whereas I have used the word "steam" throughout this specification the same has been for convenience only, and under this head I hereby include all fluid or liquid pressures of any kind whatsoever.

The special feature of the body of the engine is the form of steam-chamber produced by the inclined disk operating in conjunction with each of the conical heads with which it forms a steam-joint, modifications of which admit of either or both being movable, or the piston may be formed of a conical piston-head or of two such heads slotted diametrically to admit a piston fitting into and sliding in said slots and bearing against or universally joined to a fixed or movable head which takes the place of the disk set forth in the previous description.

It is evident that the reversing and cut-off valves may be infinitely varied in form and that the cam and its connections may be modified in various ways without going beyond the scope of this invention.

In some of the figures the disk is shown inclined one way and in some another. This feature is a matter of design only, the object being to place the disk in such a position that one of the cylinder-heads may be readily removed and the shaft and interior parts of the mechanism removed for purposes of inspection and repair.

Having thus described my invention, what I claim, and desire to secure by Letters Patent, is—

1. A rotary engine having a shaft, and a casing concentric with the shaft, and divided into halves on a plane oblique to the said shaft, each section having a beveled countersink along the meeting edge, whereby said countersinks combine to form a shallow V-shaped groove where the sections meet.

2. A rotary engine having a shaft, a casing concentric therewith and divided into halves on a plane oblique to said shaft, each section having a countersink along the meeting edge, the outer wall of said countersink being beveled, and a disk mounted obliquely on the shaft and having a double-beveled edge to enter said countersink, whereby said shaft and disk can be withdrawn from said casing without being themselves separated.

3. The combination with a shaft of a casing having a groove in a plane oblique to the shaft, a disk rotatable in said groove and having a diametrical slot with concave edges, a piston carried by the shaft and traversing said slot and strips pivoted centrally on each side of the piston and having curved outer faces fitting the slot in the disk.

4. The combination with a shaft of a casing, having a groove in a plane oblique to the shaft, a disk rotatable in the said groove, and having a diametrical slot with concave edges, a piston carried by the shaft, with wings traversing said slot, strips pivoted centrally on each side of the said piston and fitting the slot, and a spherical enlargement or filling-piece at the center of the piston.

5. In a rotary engine, a casing shaped like the central zone of a sphere, with ends having shallow internal cylindrical recesses and piston-heads adapted to rotate in and projecting beyond said recesses, having their inner faces conical.

6. In a rotary engine, with a casing having shallow internal cylindrical recesses in its ends, a shaft passing centrally through said ends, and piston-heads free to move axially on said shaft and in said recesses, and having their inner faces conical.

7. A rotary engine, having a casing shaped like the central zone of a sphere with ends having shallow internal cylindrical recesses terminating in plane faces, annular grooves in said faces, and central exterior projections with a bore tapering toward the interior of engine, and ports upon the outer walls of said casing terminating in grooves upon the interior walls.

8. A rotary engine having conical, diametrically-grooved piston-heads terminating in short cylinders, a shaft having a spherical enlargement at its center grooved upon opposite sides axially to the shaft, and loose piston-wings fitting into said grooves and those in the conical piston-heads.

9. In a rotary engine, the combination with a shaft, of conical piston-heads capable of moving axially thereon but secured to same as regards rotary motion, a spherical enlargement at the center of the piston, and oppositely-placed piston-wings fitting neatly into grooves but capable of radial motion therein, in said conical heads and spherical enlargement.

10. The combination of a shaft, piston-heads carried by said shaft, and capable of a slight movement axially thereon, said piston-heads having inner, conical, and outer plane faces, with a casing concentric with the shaft having shallow cylindrical recesses adapted to receive said piston-heads and provided with annular packing-rings whereby joints are made between said piston-heads and casing.

11. The combination with a shaft, of a casing concentric with the shaft, and divided into halves in a plane oblique to the shaft, internally grooved around the line of joint, a diametrically-slotted disk capable of rotating in said groove, piston-wings capable of slight radial motion, traversing said slot in disk, piston-heads having their inner faces conical, grooved to receive said piston-wings and terminating in short cylindrical portions with plane faces, said cylindrical portions fitting into recesses in the ends of the casing adapted to receive them, annular packing-rings in grooves in said ends of casing, and means for packing them toward the outer plane faces of the piston-heads.

12. The combination with a shaft, of a casing concentric with the shaft, a diametrically-slotted disk capable of rotating in a groove in the casing in a plane oblique to the shaft and tangent to the conical faces of piston-heads carried by and axially movable upon the shaft, a spherical enlargement at the center of the piston, radially-movable piston-wings carried in grooves in said piston-heads and spherical enlargement, filling-pieces at the outer corners of the piston-wings and means for packing the piston-heads against the disk, and the piston-wings against the walls of the casing.

13. A rotary engine having a casing shaped like the central zone of a sphere with ends having shallow cylindrical recesses therein terminating in plane faces, annular grooves forming a continuation of the walls of said recesses, and smaller concentric annular grooves in said plane faces, ports in the casing leading from said plane faces to the bottom of said grooves and ports leading from the annular spaces inclosed between the concentric grooves, to the exterior of the casing.

14. The combination with a shaft and a casing concentric with the shaft provided with ports for admission and exhaust upon its outer walls terminating in grooves on its interior, other ports leading to the ends of the casing from branch pipes leading from the source of pressure-supply to points inclosed within annular spaces between annular packing-rings in the heads of the casing, piston-heads having outer annular plane faces adapted to rotate against said packing-rings, and otherwise cored out to form chambers to contain pressure supplied from branch pipes aforesaid, ports leading from said chambers, to grooves upon inner conical faces of said piston-heads into which are free to slide radially sector-shaped piston-wings, traversing a slot in a disk capable of rotating in a groove in the casing oblique to the shaft, and tangent to the conical faces of the piston-heads, and a packed universal joint between the piston and shaft as a whole, and the aforesaid rotatable disk; substantially as specified.

15. In a rotary engine, the combination with a shaft of a casing concentric with the shaft and having bearings in its heads to carry said shaft, formed of pieces shaped as frustums of cones bored to receive said shaft divided into halves through their horizontal axes and fitting into tapering cavities in said casing-heads and prevented from turning therein by feathers set in the walls bounding said cavities, and glands bearing against the outer plane faces of said frustums of cones, and means to apply pressure inward against the glands whereby the bearings are closed against the shaft to keep same in proper alinement.

In testimony whereof I affix my signature in presence of two witnesses.

RICHD. G. V. MYTTON.

Witnesses:
H. V. WALL,
C. W. SOULÉ.